United States Patent
Halliday et al.

(10) Patent No.: US 6,834,342 B2
(45) Date of Patent: Dec. 21, 2004

(54) METHOD AND SYSTEM FOR SECURE COMMUNICATION OVER UNSTABLE PUBLIC CONNECTIONS

(75) Inventors: David C. Halliday, Sunnyvale, CA (US); David W. Lauderback, Pleasanton, CA (US); Mounir Hahad, San Jose, CA (US); Michael A. S. Potts, Palo Alto, CA (US)

(73) Assignee: EECAD, Inc., Santa Clara, CA (US)

( * ) Notice: Subject to any disclaimer, the term of this patent is extended or adjusted under 35 U.S.C. 154(b) by 625 days.

(21) Appl. No.: 09/932,436

(22) Filed: Aug. 16, 2001

(65) Prior Publication Data
US 2002/0083345 A1 Jun. 27, 2002

Related U.S. Application Data
(60) Provisional application No. 60/226,150, filed on Aug. 16, 2000.

(51) Int. Cl.[7] ............................................. G06F 01/24
(52) U.S. Cl. ....................... 713/168; 713/200; 713/201
(58) Field of Search ................................ 713/159, 200, 713/201

(56) References Cited

U.S. PATENT DOCUMENTS

| 4,200,770 A | | 4/1980 | Hellman et al. |
| 5,548,646 A | | 8/1996 | Aziz et al. |
| 5,570,209 A | * | 10/1996 | Usui et al. ..................... 349/5 |
| 5,590,199 A | * | 12/1996 | Krajewski, Jr. et al. .... 713/159 |
| 5,606,668 A | * | 2/1997 | Shwed ........................ 713/201 |
| 5,805,803 A | | 9/1998 | Birrell et al. |
| 5,918,022 A | | 6/1999 | Batz et al. |
| 6,061,797 A | | 5/2000 | Jade et al. |
| 6,061,798 A | | 5/2000 | Coley et al. |

* cited by examiner

*Primary Examiner*—Thomas R. Peeso
(74) *Attorney, Agent, or Firm*—Burns, Doane, Swecker & Mathis LLP (57) ABSTRACT

Methods and apparatus are disclosed which provide a system for secure and reliable communication between client computers residing on separate private networks but connected via a public network such as the Internet. The communications described herein are designed to function even if a persistent link can not be established between the two computers. Further, the systems and apparatus described herein are designed to traverse any locally installed gateways or firewalls to obtain access to a remote destination.

19 Claims, 11 Drawing Sheets

Fig. 4a LOCAL MESSAGE DATA

LOCAL MESSAGE DATA 50

Fig. 4b PRIVATE SEND DATA FORMAT

DATA PACKET 4H

Fig. 6. LOCAL SEND MESSAGE FORMAT
HTTP POST ENCAPSULATED

ENCAPSULATED DATA
PACKET 6D

Fig. 7. PRIVATE SEND MESSAGE FORMAT
HTTP GET ENCAPSULATED

ENCAPSULATED DATA
PACKET 7D

Fig. 5. PUBLIC COMPOUND REPLY

AGGREGATED DATA
PACKET 5H

Fig. 8. UNPACKED REPLY DATA

REPLY PACKET DATA 8F

METHOD AND SYSTEM FOR SECURE COMMUNICATION OVER UNSTABLE PUBLIC CONNECTIONS

This application claims the benefit of U.S. Provisional Application No. 60/226,150 filed Aug. 16, 2000 and entitled Method and Apparatus for Secure Communication Over Unstable Public Connections, the entire content of such Application being expressly incorporated herein by reference.

BACKGROUND OF THE INVENTION

1. Field of the Invention

The present invention relates to the field of data communication between computer systems. More specifically, it relates to a method of communication between a local computer system potentially protected by a firewall and a remote computer system connected to the local system via a public network.

2. Background Information

In the field of communications many systems exist for passing data from one point to another. A typical communication system consists of several layers. A low-level layer might include software designed to drive hardware devices, such as modems or Ethernet interface cards. An example of a fully featured top-level software transport layer that is designed to provide reliable end to end communications is the TCP/IP protocol. Computer Networks, by Andrew S. Tanenbaum, printed by Prentice Hall PTR, Upper Saddle River, N.J. 1996, provides a more detailed view of computer networks, TCP/IP and the OSI model.

This invention builds upon a number of established systems that can be readily understood by one skilled in the art. These systems are summarized as follows:

Protocol encapsulation: This is a technique where high-level communication messages are packaged into the payload of a lower level communication system. One example of this is the manner in which TCP/IP messages are packaged into Ethernet packets for communication over a local area network (LAN). In a similar way TCP/IP can be packaged into Frame Relay packets for communication over wide area networks (WAN), or into serial streams for communication over networks such as the Internet. Protocol encapsulation can also be application-specific, as described in Batz et al., U.S. Pat. No. 5,918,022 entitled Protocol for Transporting Reservation System Data Over A TCP/IP Network. The present invention, while possessing some limitations, is intended for general use and is not necessarily tied to any specific application.

TCP/IP: This basic communications medium is described in detail in the above referenced work by Tanenbaum and provides a reliable point-to-point communication system that applications can use to communicate. Protocol encapsulation methods have been written that can encapsulate TCP/IP requests into just about every conceivable low-level network transport, including Ethernet and PPP.

HTTP and HTTPS: HTTP is a high-level protocol that builds upon TCP/IP and was designed specifically to carry content between Web sites and Web browsers. HTTPS is a secure implementation of HTTP that is used for transmitting sensitive data such as credit card details.

HTTP firewalls and Proxies: With recent advances in electronic communications, corporations have begun to use public networks, specifically the internet, for internal communications, communications with clients, and for accessing public data stores such as third-party web sites. Corporations are normally connected to the Internet through dedicated communications links that are available on a permanent basis. However, Internet connectivity poses a great security risk to a corporation: any machine with a known address that can access the Internet is in turn accessible from any other machine on the Internet. To prevent unwanted third-party access, most corporations, and some individuals, deploy firewalls to secure their sites. A firewall is a computer software and hardware solution that allows communications to be originated only from within the secure site. For example, most firewalls allow outgoing HTTP traffic (Web page requests) and incoming replies to messages originated within the site (Web pages). Email is often allowed to pass directly into a secure site as it intended to be a passive form of communication. This ability to allow limited communication is often performed by a proxy. A proxy is a forwarding agent that receives a request for information from a computer within the secure site, passes it to a destination, and returns any responses to the originator. The combination of a firewall preventing access to machines within a secure site, and a proxy masking a secure machine's true identity, provide a level of security which most demand. Some corporations impose an even higher level of security by restricting, or denying completely, certain forms of outgoing communication. For example, many corporations permit only small amounts of data to be sent through their firewalls; this can be accomplished by denying HTTP POST requests and disabling all other upload protocols, such as FTP. More details can be found in Coley et al., U.S. Pat. No. 6,061,798 entitled, "Firewall System for Protecting Network Elements Connected To A Public Network."

Tunnels: With the deployment of firewalls and proxies it became impossible, or at least quite difficult, to provide a bi-directional communication system between a computer within a secure site and another computer on the Internet. Several solutions exist that require special bypasses or tunnels to be added to firewalls, but these typically require additional applications to be executed on the firewall host. This is at the least an inconvenience, and often prohibited due to security considerations. For more detail, see Jade et al, U.S. Pat. No. 6,061,797 entitled "Tunnels Outside Access To Computer Resources Through A Firewall"; Birrell et al, U.S. Pat. No. 5,805,803 entitled, "Secure Web Tunnel," and Aziz et al., U.S. Pat. No. 5,548,646 entitled, "System For Signatureless Transmission And Reception Of Data Packets Between Computer Networks." The present application describes a system that does not deploy anything on a firewall host, and yet allows reliable two-way communications between local and remote applications using only HTTP. As discussed above, HTTP requests are normally successfully proxied through firewalls.

Encryption: While the present embodiment of the invention makes use of encryption to provide secure communications, it should be clear to one skilled in the art that any one of a number of available techniques could be used, and the invention is not dependent on the exact method used. It should also be apparent that a non secure embodiment of the invention is possible by not using encryption. For example, in one embodiment the process described in Hellman, et al., U.S. Pat. No. 4,200,770 entitled, "Cryptographic Apparatus and Method," might be used.

SUMMARY OF THE PRESENT INVENTION

Methods and apparatus are disclosed which provide a system for secure and reliable communication between a pair of client computers, or a plurality of client computers residing on separate private networks, and connected via a public network such as the Internet. The communications described herein are designed to function even if a persistent link can not be established between the communicating computers. Further, the system described herein is designed to traverse any locally installed gateways or firewalls to obtain communicative access to a remote destination.

DETAILED DESCRIPTION OF THE INVENTION

In the following description, various aspects of the present invention are described. However, it will be apparent to those skilled in the art that the present invention may be practiced with only some or all aspects of the present invention. For the purposes of explanation, specific numbers, materials and configurations are set forth to provide a thorough understanding of the present invention. However, there it will also be apparent to one skilled in the art that the present invention may be practiced without the specific details. In some instances, well known features are omitted or simplified in order not to obscure the present invention.

Parts of the description are presented in terms of operations performed by a computer system, using terms such as data, values, characters, strings, numbers and the like, consistent with the manner commonly employed by those skilled in the art to convey the substance of their work to others skilled in the art. As is well understood by those skilled in the art, these quantities take the form of electrical, magnetic, or optical signals capable of being stored, transferred, combined, and otherwise manipulated through mechanical and electrical components of the computer system. The term computer system as used herein includes general purpose as well as special purpose data processing machines, systems, and the like, that are standalone, adjunct or embedded.

Various operations are described as multiple discrete Steps in turn, in a manner that is most helpful in understanding the present invention, however, the order of description should not be construed as to imply that these operations are necessarily order dependent. In particular, all operations need not be performed in the order of presentation.

Figure 1:
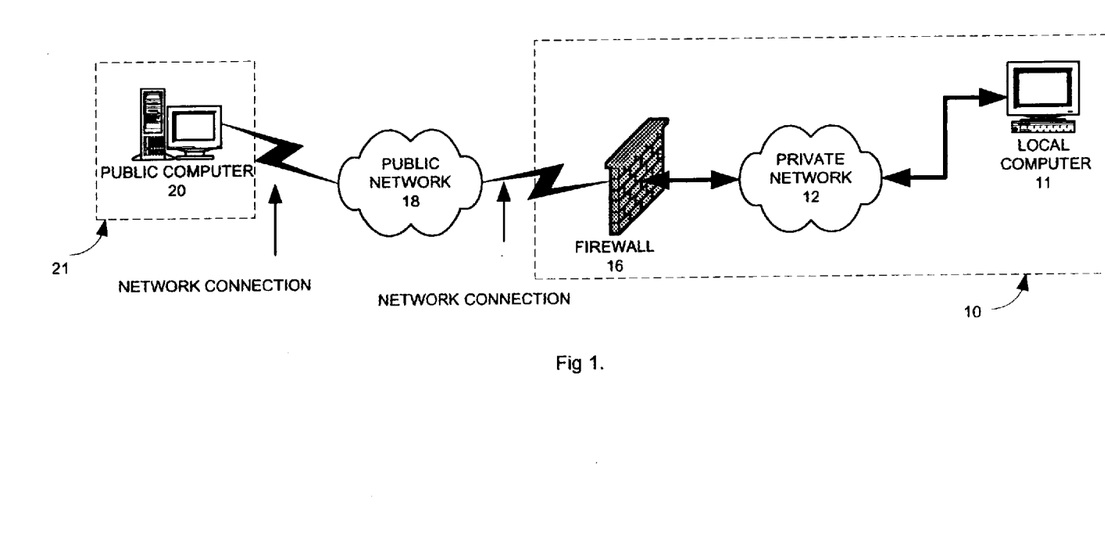
FIG. 1 generally depicts an environment in which the present invention may be deployed.

Description of FIG. 1

In FIG. 1, the environment in which the present invention may be deployed is shown. This environment is typically comprised of a local computer system 10, which may include a local computer 11, on which part of the present invention resides, connected by a private network 12, through a firewall 16 to a public network 18, such as the Internet. This connection may be unstable, in the sense that the data path may inadvertently be interrupted from time-to-time. Another part of the present invention resides on a public computer 20, which may be a component of a remote computer system 21, that is connected directly to the public network 18.

Figure 2:
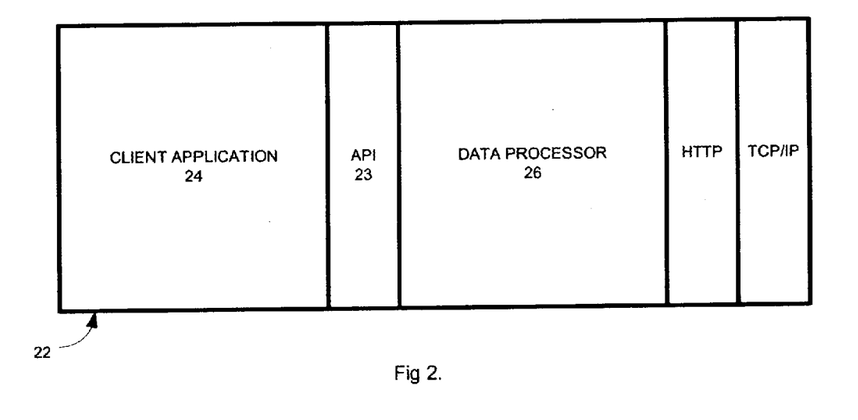
FIG. 2 is a diagram schematically illustrating the architecture of a client application and associated data processor in accordance with the present invention.

Description of FIG. 2

It is well known to those skilled in the art that the general architecture of client applications may consist of client application code, linked with third-party application libraries. In FIG. 2, the architecture utilized in accordance with the present invention is shown generally at 22. As depicted, the client application 24 is linked via an Application Programming Interface (API 23) to a specially configured data processor 26. As is also well known to those skilled in the art, the actual form of the API may be configured to provide an unlimited number of different views of the processor to fit pre-existing application code architectures. The processor 26 makes use of the HTTP protocol and the TCP/IP protocol described above.

Figure 3:
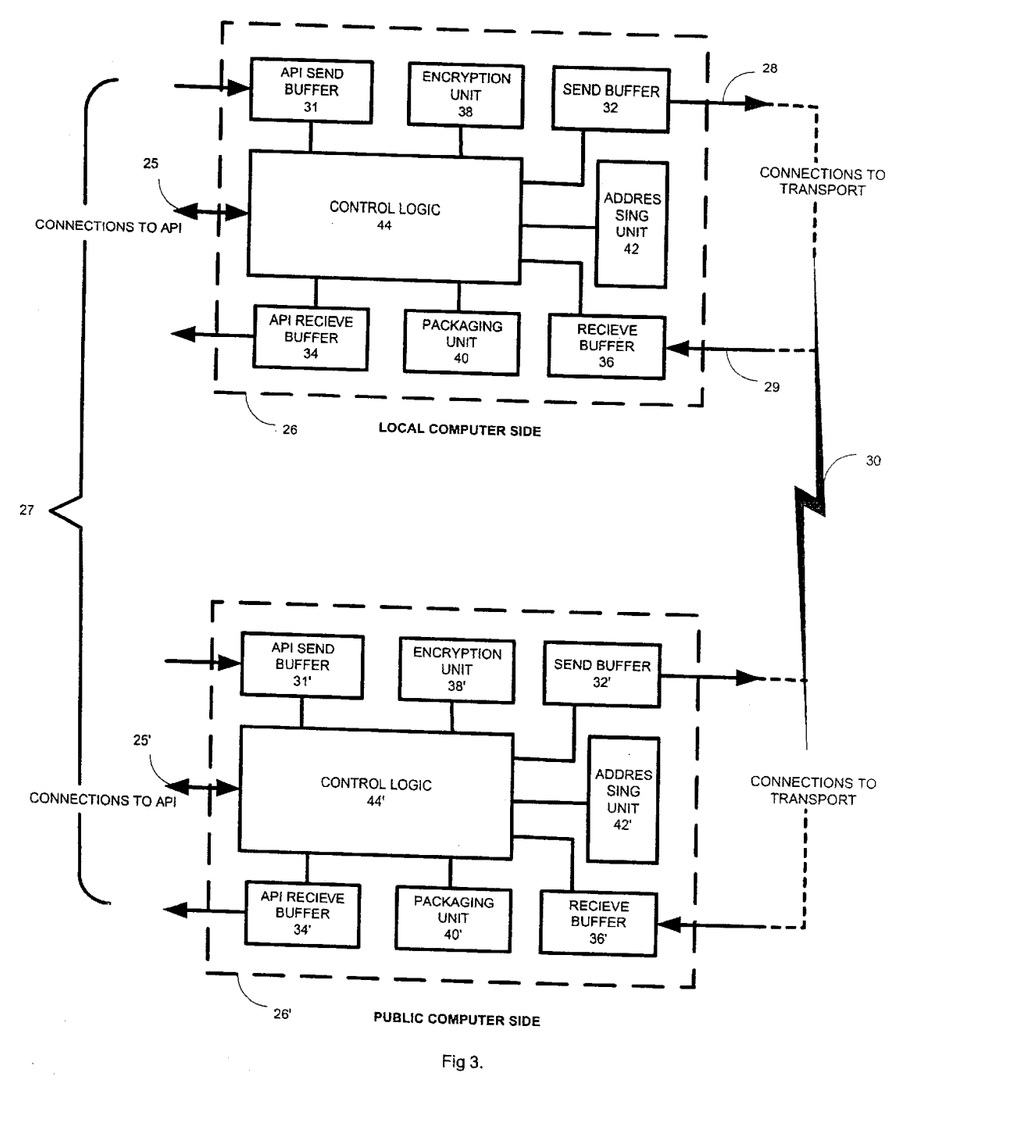
FIG. 3 is a diagram schematically illustrating one embodiment of the data processor architecture used in accordance with the present invention.
Figure 4A:
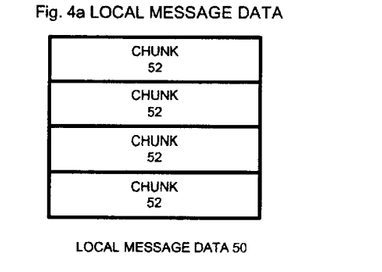
FIGS. 4a and 4b illustrate the composition of a data packet constructed and sent by a local computer in accordance with the present invention.

Description of FIGS. 3 and 4a.

FIG. 3 depicts generally at 27 the overall architecture of the present invention. In one embodiment the processor 26 may be implemented in computer hardware. In another embodiment the processor 26 may be implemented as computer software. It should be clear to those skilled in the art that the processor 26 could also be a combination of both, without limitation as to which portion of the architecture is implemented in hardware or software.

Data intended to be included in a transmittable Local Message is schematically represented by the block 50 in FIG. 4a. This data enters and exits the processor 26 in the local computer through the connections 25 to the API buffers 31 and 34 on one side thereof, and after being encrypted, packaged, and encapsulated for transmission, the data leaves the processor through communications buffer 32 on the other side and enters the transporting network(s) 30. Data entering the processor from the transport side is received by the buffer 36 and after the encapsulation is removed, is decrypted and unpackaged, and then placed in the API receive buffer 34. In processor 26, the API send buffer 31, data send buffer 32, API receive buffer 34 and data receive buffer 36 all provide temporary storage means for data in transit.

An encryption unit 38 is responsible for encrypting and decrypting the message data. A packaging unit 40 operates under control of control logic 44 and is responsible for dividing the encrypted local message data into "chunks" 52 (FIG. 4a) of predetermined size, and for combining the chunks with identifying header data 54 (FIG. 4b) to form data packets 4H, as will be described below. Packaging unit 40 also performs an unpacking operation with respect to received data. An addressing unit 42 is responsible for encapsulating the outgoing data packets to fit the transport protocol requirements for data transmission, and for stripping incoming encapsulated packets of their encapsulation, as will be described below.

In accordance with the present invention, another processor 26' resides on the public computer 20 (FIG. 1) and is substantially identical to that of the local computer described in the upper part of FIG. 3. Entities 31' through 44' are functionally identical to entities 31 through 44.

Figure 4B:
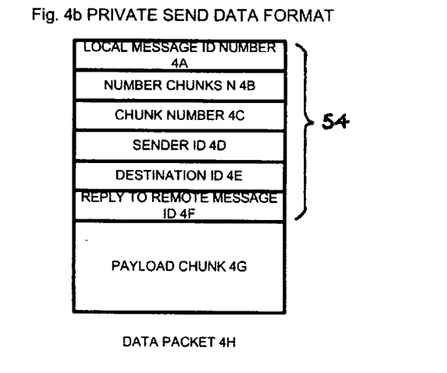

Description of FIG. 4b

FIG. 4b illustrates one configuration of the components of a data packet transmitted from a local computer 11 to a public computer 20 after packaging but before encapsulation. It will be clear to those skilled in the art that the order in which the components of the packet are assembled is unimportant, as is the exact nature and number of the components. Component 4A is an identification number unique to the local message, identifying the local message on both the local computer 11 and the public computer 20. 4B is the number of chunks in which the original local message is divided for transmission from the local computer 11 according to the present invention,. 4C is the chunk number of this instance of the message as determined by a process explained below. 4D is the identification (ID) of the sender of the particular message, and 4E is the identification (ID) of the destination. 4F specifies which remote message this local message is a reply to, if in fact it is a reply to a previously received message from the public computer 20. If this message is not a reply, then this ID will be null. 4G represents the payload of the data packet. As suggested above, the payload may be an entire message to be sent, or if the length of the message exceeds the limits of the firewall 16 (FIG. 1), a partial message, or chunk.

Figure 5:
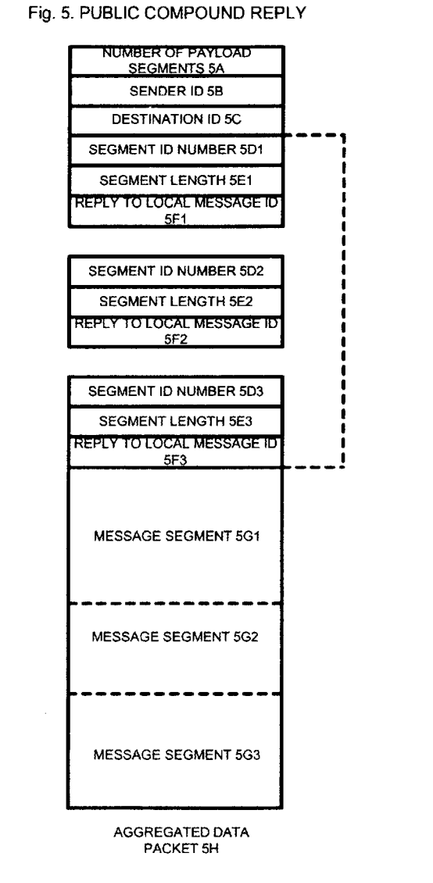
FIG. 5 illustrates one embodiment of the composition of an aggregated data packet constructed and sent by a public computer as a reply to a message from a local computer in accordance with the present invention.

Description of FIG. 5

FIG. 5 illustrates one configuration of either an Aggregated Data Packet in which is included either an original message or a reply message to be transmitted through the firewall from a public computer 20 to a local computer 11. As described above, the Payload of this packet can also be an aggregation of multiple messages, or message segments, to be sent at the same time to the local computer. This packet is comprised of a header in which component 5A specifies the Number of Messages, or "Payload Segments", in the Aggregated Data Packet contained within the transmission, and 5B and 5C identify the Sender and the receiver (Destination) respectively. For each included Payload Segment, a Segment Identification Number 5D, its Length 5E, and the Identification Number 5F of the Local Message to which it is potentially a reply, is specified. The Payload 5G of this packet includes a concatenation of all of the Message Segments (of which three, 5G1, 5G2 & 5G3 are shown) to be communicated by the packet.

Figure 6:
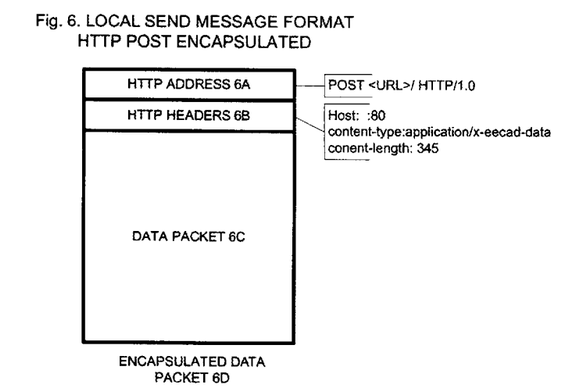
FIG. 6 illustrates an embodiment of the composition of an HTTP POST encapsulated data packet for transmission from a local computer to a remote computer through a firewall in accordance with the present invention.

Description of FIG. 6

FIG. 6 shows the format of one embodiment of an encapsulated data packet to be sent from a local computer 11 to a public computer 20. In this embodiment, it is assumed that the HTTP POST operation is allowed with regards to the security policy enforced at the site where the local computer resides. The HTTP Address 6A contains the address of the public computer 20 written according to the HTTP syntax. The Header 6B contains fields required by the HTTP protocol, such as the total message length in bytes. The payload 6C is comprised of a data packet of the configuration illustrated in FIG. 4b.

Figure 7:
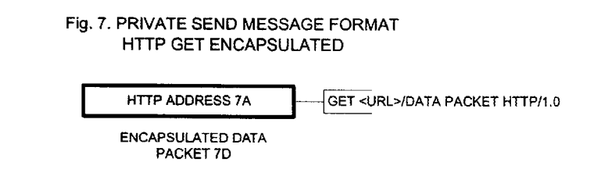
FIG. 7 illustrates an embodiment of the composition of an HTTP GET encapsulated data packet for transmission from a local computer to a remote computer through a firewall in accordance with the present invention.

Description of FIG. 7

FIG. 7 shows an alternative embodiment of an encapsulated message to be sent from a local computer 11 to a public computer 20. In this embodiment, it is assumed that only HTTP GET operations are permitted with regards to the security policy enforced at the site where the local computer 11 resides. In this case, the entire Data Packet (or portions thereof) need to be transmitted as part of one or more Encapsulated Data Packets each having an HTTP address specified in a GET command. Such addresses are nonexistent, but the public computer knows how to decode these addresses into a useful message.

Figure 8:
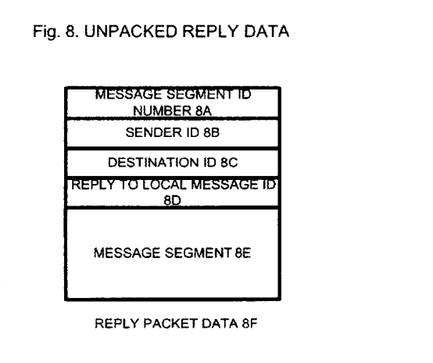
FIG. 8 illustrates one embodiment of the composition of an individual reply data packet after it is received and unpacked by a local computer in accordance with the present invention.

Description of FIG. 8

Figure 11:
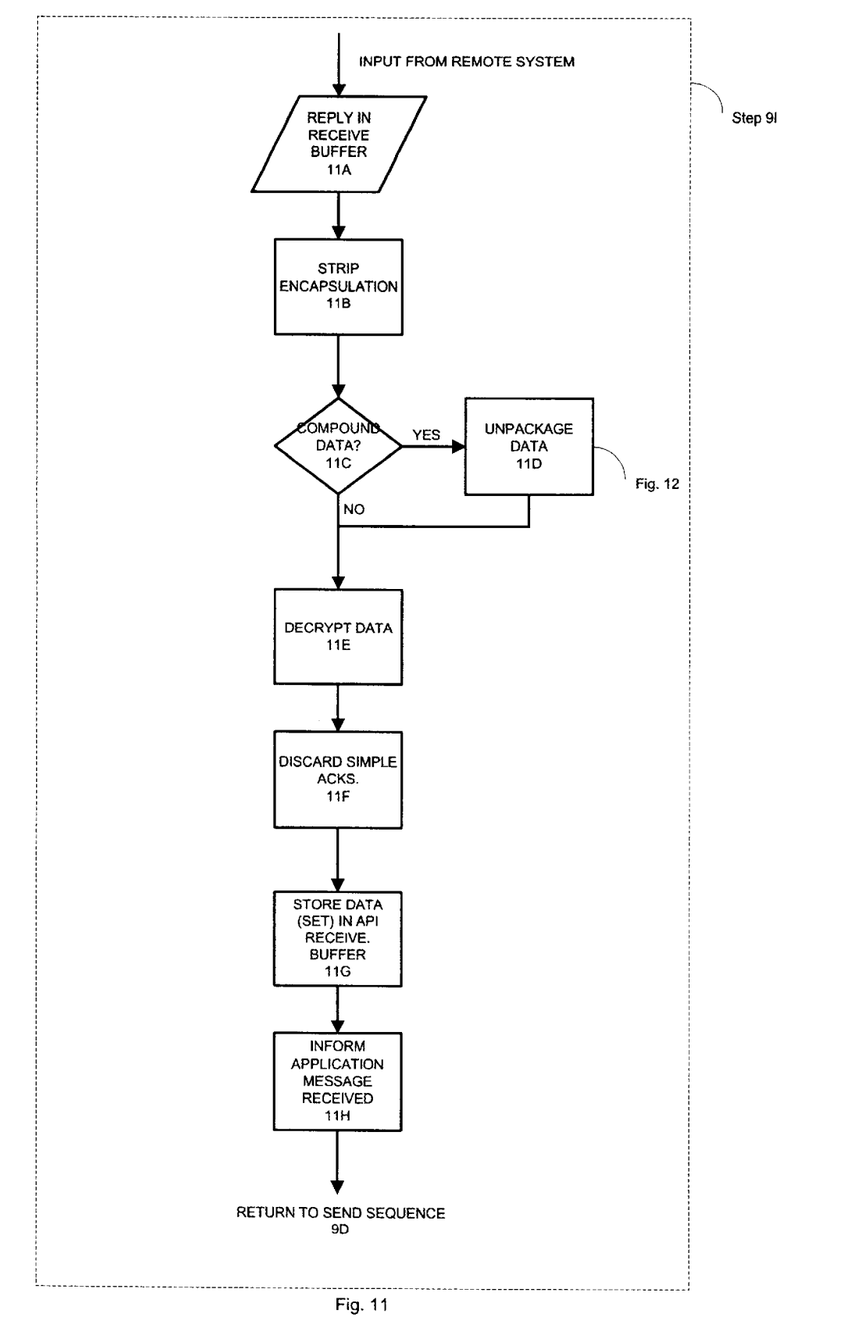
FIG. 11 depicts a flow chart generally illustrating an embodiment of the process reply substep of FIG. 9 wherein encapsulated data packets (FIGS. 6,7) received by a local computer are processed in accordance with the present invention.

FIG. 8 shows one embodiment of an Unpacked Data Packet 8F in the form received by the local computer 11 after the Aggregated Data Packet (FIG. 5) is decomposed (as illustrated in FIG. 11 below) in accordance with the present invention. As depicted, the message is delivered to the client application 24 in a packet form including a Message (payload segment) ID 8A, a Sender ID 8B, a Destination ID 8C, a Local Message ID 8D to which this message is a Reply, and the Message Segment 8E.

Figure 9:
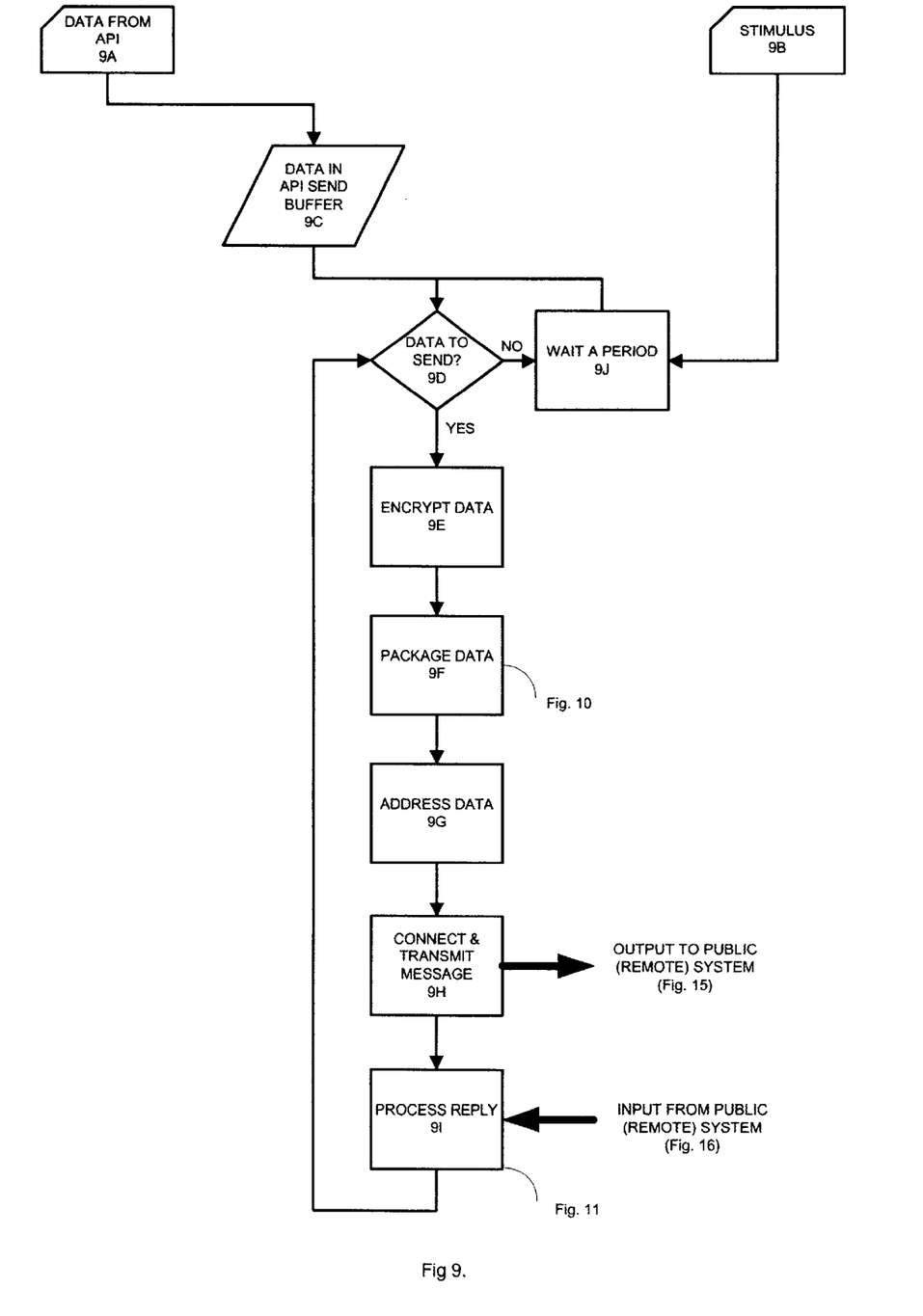
FIG. 9 depicts a flow chart generally illustrating an embodiment of the process by which data is processed, encapsulated and transmitted from a local computer in accordance with the present invention.

Description of FIG. 9

Referring now to FIG. 9, as well as previously described figures, when a client application running on a local computer 11 of the local computer system 10 needs to transmit data (a message) to a remote public computer 20, the application 24 (FIG. 2) in Steps 9A and 9C uses the associated API to deposit blocks of information in the API send buffer 31, such information including the data to be communicated ("local message"), the sender address, the destination address, and the reply to message ID. A stimulus (Step 9B) is then applied to the control logic 44 by the client application to abort the waiting (Step 9J) and trigger data processing. A stimulus is a request to cut short the wait period (9J). An example of such a request might be any internal or external event the occurrence of which triggers the immediate processing and sending of the data payload in buffer 9C via 9E-9I.

In Step 9E, the message data present in the API send buffer 32 is encrypted by the encryption unit 38, using an appropriate encryption mechanism, to obtain encrypted data.

In Step 9F of the preferred embodiment, the packaging unit 40 splits the encrypted message data into small "chunks", as illustrated above in FIG. 4a and described below with respect to FIG. 10, to accommodate the firewall restrictions of the communication path with regards to the permissible amount of data transmitted in a single message.

Figure 10:
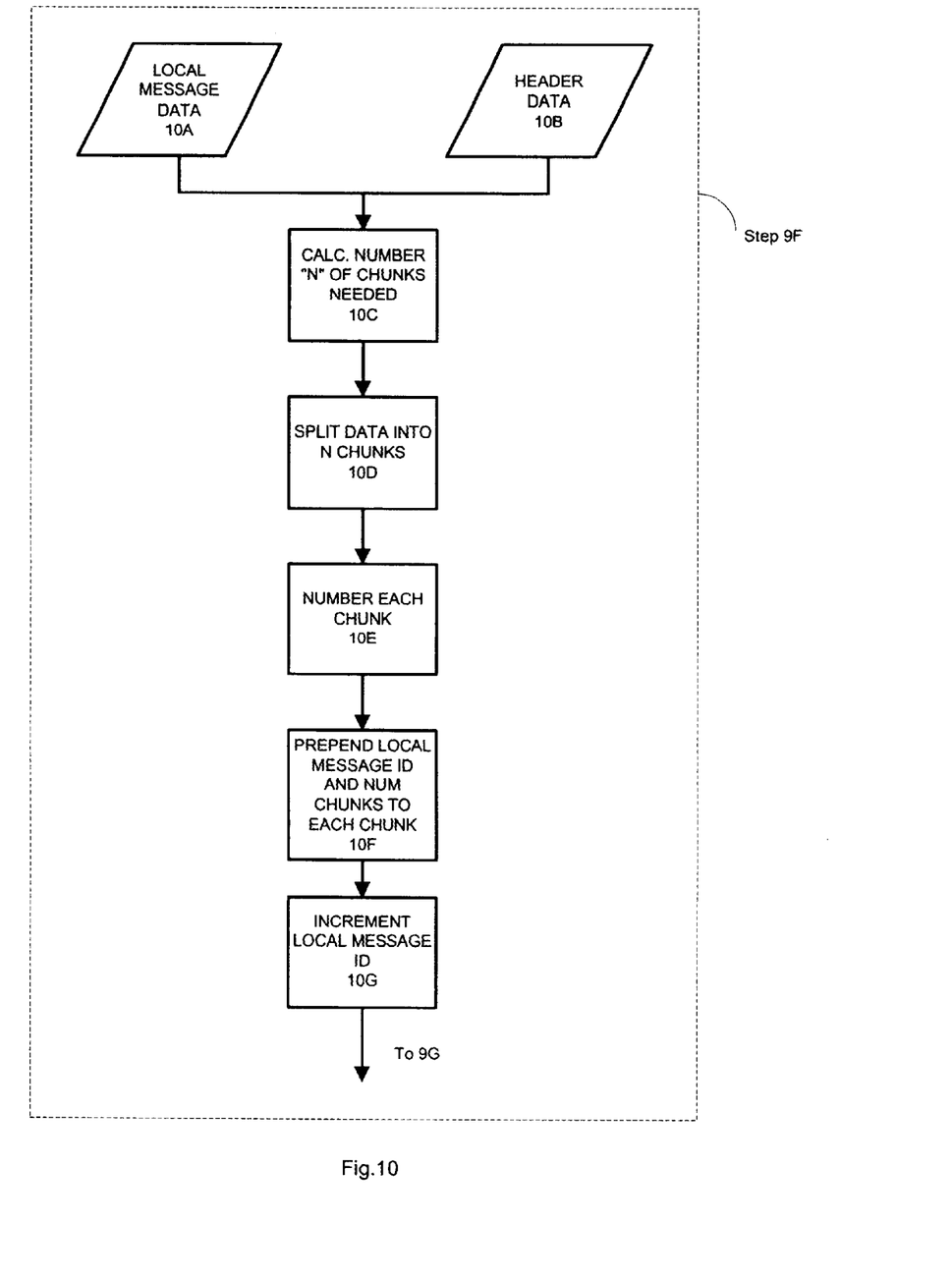
FIG. 10 is a flow chart generally illustrating an embodiment of the process by which a local computer implementing the process of FIG. 9 splits a message originating at the local computer system into suitably-sized chunks and packages it according to FIG. 4 for transmission in accordance with the present invention.

Description of FIG. 10

Skipping ahead momentarily to FIG. 10 which illustrates in more detail the packaging process of Step 9F, it will be noted that in Step 10C the packaging unit 40 (FIG. 3) looks at the encrypted local message (10A) and then, depending on the firewall imposed limit on the length of message allowed, calculates the number "N" of chunks necessary for the current block (FIG. 4a) of Local Message Data. For example, N=(Local Message size)/(maximum message size−header size) rounded up. The data is then split into data chunks, each chunk is numbered at step 10E, and the Local Message ID 4A and the Number of Chunks 4B are prepended at Step 10F. The packaging unit then increments the local message ID in Step 10G and preprocesses the next message. More specifically, the packaging unit 40 assembles each chunk of the encrypted Local Message Data into a Data Packet 4H including, as illustrated in FIG. 4b, (1) the Local Message ID Number (4A) common to all chunks of the same encrypted block of message data, (2) the Number N of Chunks (4B) required to form the original encrypted block of message data, and (3) the current chunk sequence number (Chunk Number 4C).

Reverting now to FIG. 9, in Step 9F, to complete the packet header 54 (FIG. 4b), the following addressing items are duplicated into each Data Packet 4H:

(4) the local computer's address (Sender ID 4D);

(5) the public computer's address (Destination ID 4E); and (6) an identification of any message to which this data is a response, if applicable, (Reply To Remote Message ID 4F).

In an alternative embodiment of the present invention wherein a firewall 16 does not restrict the amount of data transmitted in a single message, packaging unit 40 augments the encrypted but undivided block of message data with a simpler header including:

(1) the Local Message ID Number;

(2) the local computer's identification (Sender ID);

(3) the public computer's identification (Destination ID); and (4) an identification of the message to which this data is a response, if applicable, (Reply To Remote Message ID).

In Step 9G, the Data Packets are encapsulated into HTTP POST messages, or HTTP GET messages (depending on whether or not the security policy implemented by the firewall allows POST messages to traverse to the public network). If POST messages are allowed, the addressing unit 42 adds to the Data Packet an HTTP address and an HTTP header (as explained above with respect to FIG. 6). If POST messages are not allowed, the addressing unit inserts the Data Packet into one or more HTTP GET messages as described above and shown in FIG. 7.

In Step 9H, the Control logic 44 then deposits the resulting Encapsulated Data Packet into the send buffer 32 (FIG. 3) where it is made available for transmission to the public computer 20 via connections to transport 30. Typically, this will establish a connection to the public computer (or the firewall if present) to which the message will be transmitted. The connection is then maintained until a reply is returned. This process can be carried out by any number of available web communication standard libraries.

When a reply is received from the public computer 20 via the firewall 16, the reply is processed in Step 9I as further described below with respect to FIG. 11.

Description of FIG. 11

FIG. 11 illustrates an embodiment of the program flow in accordance with the present invention which implements the processing of a reply to a message that was previously sent out to a public computer by a client application resident in the local computer. As in the processing and transmission of the messages originating at the local computer, the reply messages originating at the remote computer may also be encapsulated in an HTTP protocol package including HTTP header information describing the following content. When the reply message is received from the public computer 20 via the connections to transport 30 and over the established connection, the encapsulated message is placed in the receive buffer 36 (FIG. 3) as indicated at 11A.

In Step 11B the encapsulation is stripped from the received data packet and discarded leaving the Aggregated Data Packet (FIG. 5). The Packet is tested at 11C to determine whether or not it includes compound data, i.e., multiple Message Segments. If not, the payload is decrypted and processing continues. If the Packet is compound, then it is unpackaged as set forth in FIG. 12.

Figure 12:
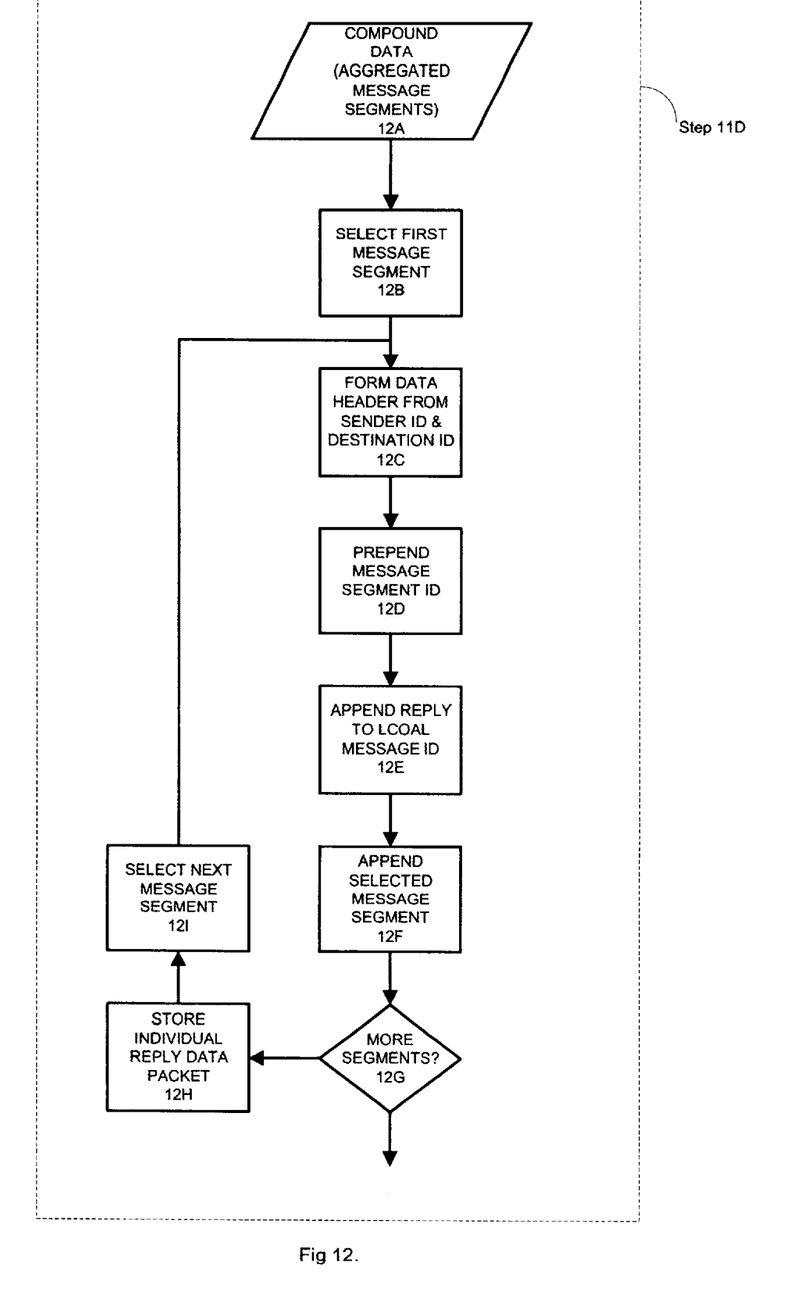
FIG. 12 is a flow chart generally illustrating an embodiment of the packet separating substep of FIG. 11 wherein payload message segments are extracted from an aggregated data packet (FIG. 5) and individual data packets (FIG. 8) are assembled in accordance with the present invention.

Description of FIG. 12

FIG. 12 is a block diagram illustrating the Public Compound Reply message separation process invoked in Step 11D. When a message is received from the remote public computer 20 in the form of an Aggregated Data Packet, illustrated in FIG. 5, the packaging unit 40 selects the first Message Segment (5G1 in FIG. 5) identified by the header component, Message Segment ID Number 5D1. In Step 12C, the packaging unit 40 forms a new data header by concatenating the Sender ID 5B1 and the Destination ID 5C1. The packaging unit 40 then prepends (at 12D) the Segment ID Number 5D1 and then at 12E, appends the Reply to Local Message ID 5F1 to form the new header. It then appends the selected Message Segment 5G1 to the header to form an individual Reply Data Packet 8F (as illustrated in FIG. 8).

To recap the above, the Aggregated Data Packet is comprised of several individual component parts. In Step 11D the packaging unit 40 unpacks the received Aggregated Data Packet and reconfigures it into a plurality of individual Reply Data Packets 8F including:

a header comprised of
(1) a Message Segment ID Number (8A);
(2) a Sender ID (8B);
(3) a Destination ID (8C); and
(4) a Reply to Local Message ID (8D); and a payload including
(5) a Message Segment (8E).

Returning now to FIG. 11, in Step 11E, the encryption unit 38 (FIG. 3) decrypts the Message Segment of each individual Packet and discards simple Acknowledgements (11F) before depositing the Reply Data Packets into the API receive buffer 34 at Step 11G. The control logic 44 then informs (at 11H) the application 22, via the connections to the API 23, of the presence of the decrypted Reply Data Packet in the receive buffer. The program flow then proceeds to the send sequence (Step 9D of FIG. 9).

It is well known to those skilled in the art that the remote public computer 20 cannot initiate a communication with a client, or local, computer 11 that is protected from the public network 18 by a firewall 16 using the HTTP communications protocol. Therefore, all messages sent by the remote computer 20 to the local computer 11 must be in the form of responses to requests originated from the local computer 11.

Figure 13:
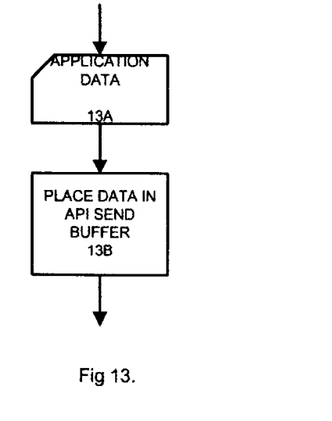
FIG. 13 depicts a flow chart generally illustrating an embodiment of the process by which a public application sends data in accordance with the present invention.

Description of FIG. 13

Accordingly, in order to send a properly formatted block of data (Aggregated Data Packet) to local computer 11, the public computer 20 must first place the data block in its API send buffer 31' as indicated in Step 13B. It should be noted however, that this data is not sent immediately, but must wait for a communication from the local computer 11 before actual transmission back to the local computer.

Figure 14:
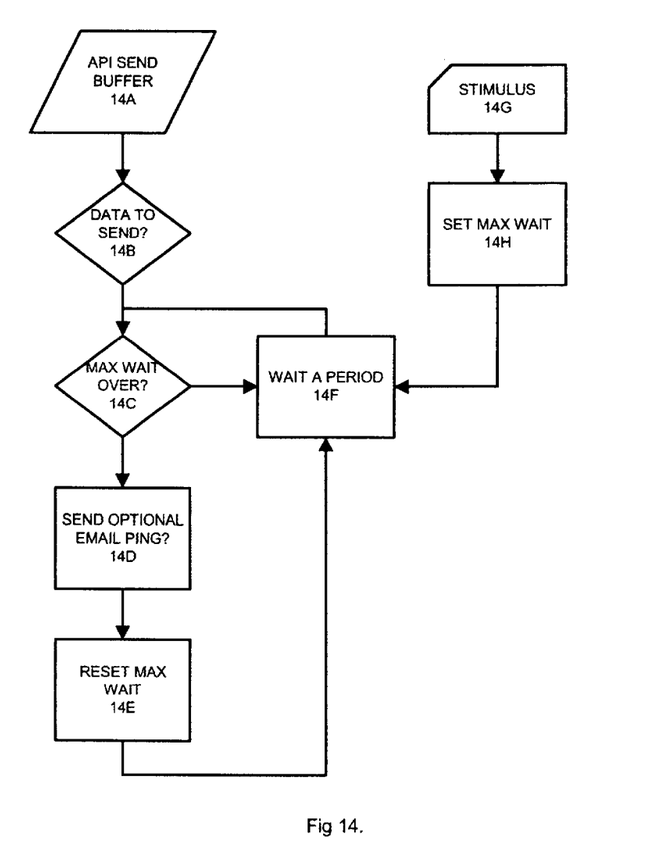
FIG. 14 depicts a flow chart generally illustrating an embodiment of the process by which a public computer system may request information from a local computer system.

Description of FIG. 14

FIG. 14 is a flow diagram illustrating a situation wherein it is urgent that data stored in the API send buffer 31' be sent without further delay. In such a case, the control logic 44' (FIG. 3) generates a stimulus. In accordance with the present invention, the stimulus may, for example, be an e-mail message sent from the public computer 20 to the local computer 11 through usual e-mail communication channels which, incidentally, pass freely through the firewall. Upon arrival at the local computer 11, the processing of the e-mail message will prompt the local computer that a message is waiting to be sent from the public computer 20, and in response, a stimulus (14G) will be generated causing immediate processing of the message in API Send Buffer 31' (Step 13B). Otherwise, the control logic 44' will cause the system to wait (Step 14F) until a predefined period of time expires, at which time a stimulus is generated, as described above.

Figure 15:
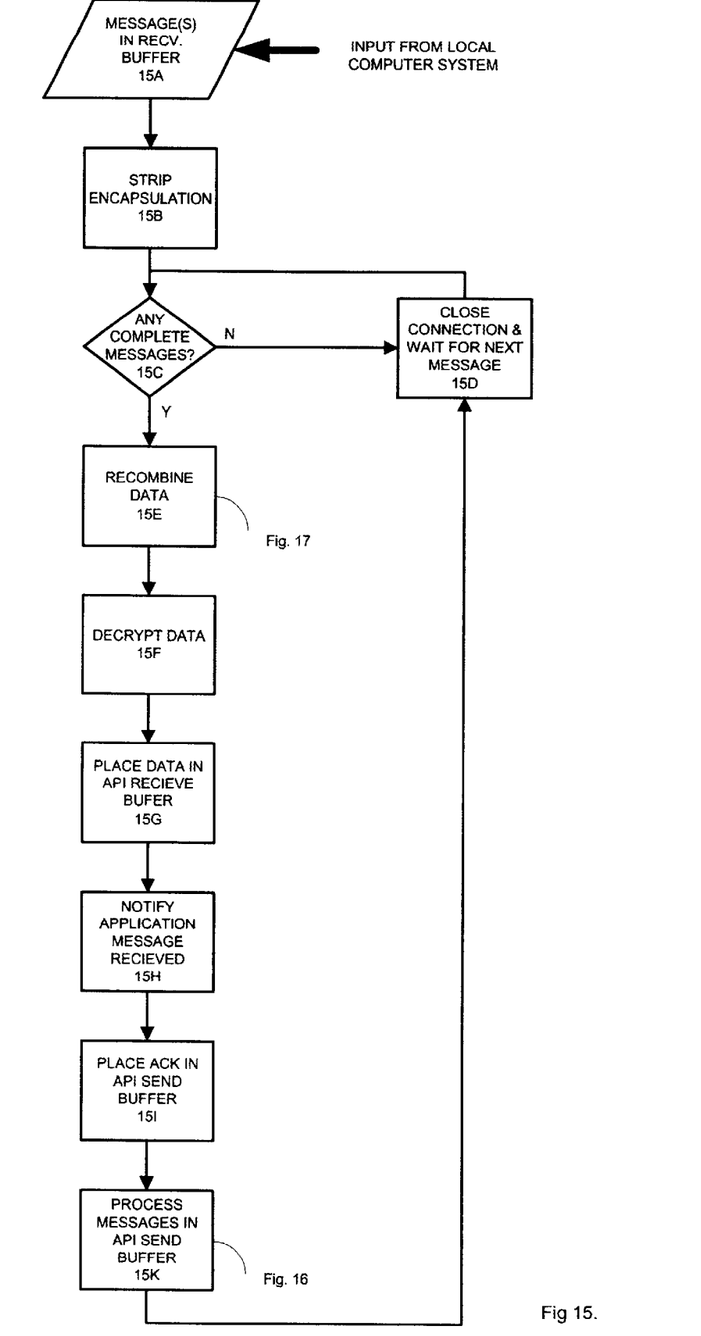
FIG. 15 is a flow chart generally illustrating an embodiment of the process by which a public computer receives and processes data in accordance with the present invention.

Description of FIG. 15

When a message is received (15A) by the public computer during the waiting period (FIG. 14), the processing of the received message is engaged, and the packaging unit 40' strips the HTTP encapsulation from the received message (Step 15B), and determines whether or not there are any complete messages presented. If so, the header data and message data are recombined in Step 15E as is more clearly depicted in FIG. 17.

Figure 17:
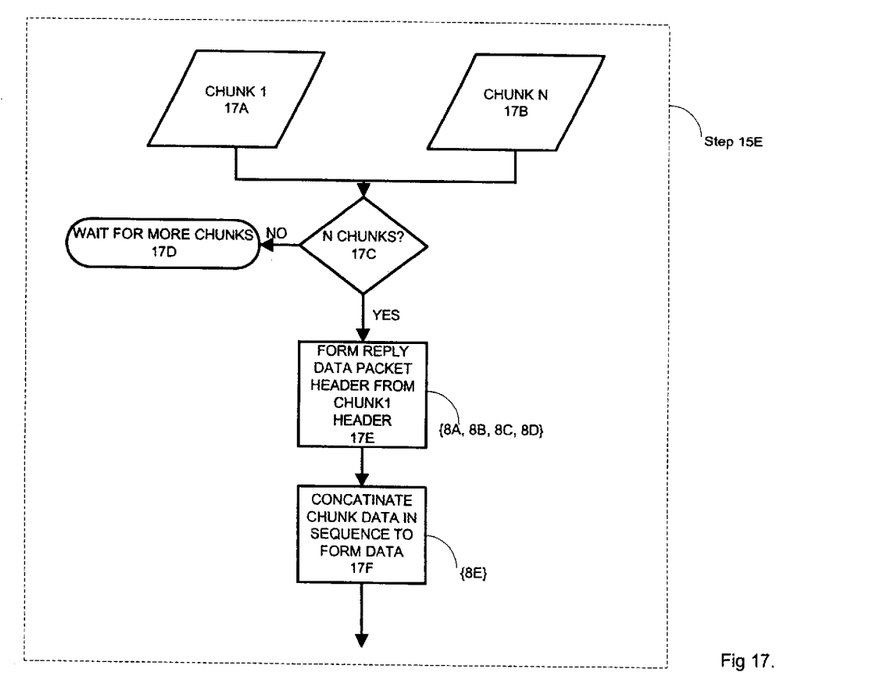
FIG. 17 is a flow chart generally illustrating an embodiment of the recombine data substep of FIG. 15 by which a public computer recreates a message from its constituent chunks in accordance with the present invention.

Description of FIG. 17

Jumping ahead, FIG. 17 illustrates the message recombination process of Step 15E. After receiving a message, and after the addressing unit 42' has stripped the HTTP wrapper from the message, the packaging unit 40' (in public computer 20) waits until it has received N chunks of data (17C); N being specified in the message packet. Once all N chunks are received, the packaging unit forms a data header (Step 17E) comprising:

(1) Message Segment ID number;
(2) Sender ID;
(3) Destination ID and;
(4) Reply to Local Message ID.

Then it concatenates (17F) all of the data chunks into one Message Segment (8E in FIG. 8).

Returning to Step 15C in FIG. 15, wherein the packaging unit 40' assesses the completeness of the message, it will be understood that the data segment can be complete message or a portion of a multi-part message as described above with respect to FIG. 10. If no complete message can be formed from the contents of the receive buffer 36', the connection is closed and the wait is resumed for more incoming messages. As soon as a complete message can be formed, the packaging unit 40 recombines all chunks and forms an individual data packet (Step 15E). The data part of the packet is then decrypted by the encryption unit 38' (Step 15F) and the control logic 44' deposits the decrypted data packet in the API receive buffer 34' (Step 15G) and informs the application (Step 15H) that a message is pending retrieval via connections 25' to the API.

To ensure that every message from the local computer 11 receives an answer, the control logic 44' places an acknowledgement (ACK) in the API send buffer 31' (Step 15I), and in Step 15K, processes the messages in the API send buffer as described above with respect to FIG. 16. The public computer then terminates the connection and resumes a wait for new messages as indicated by Step 15D.

Figure 16:
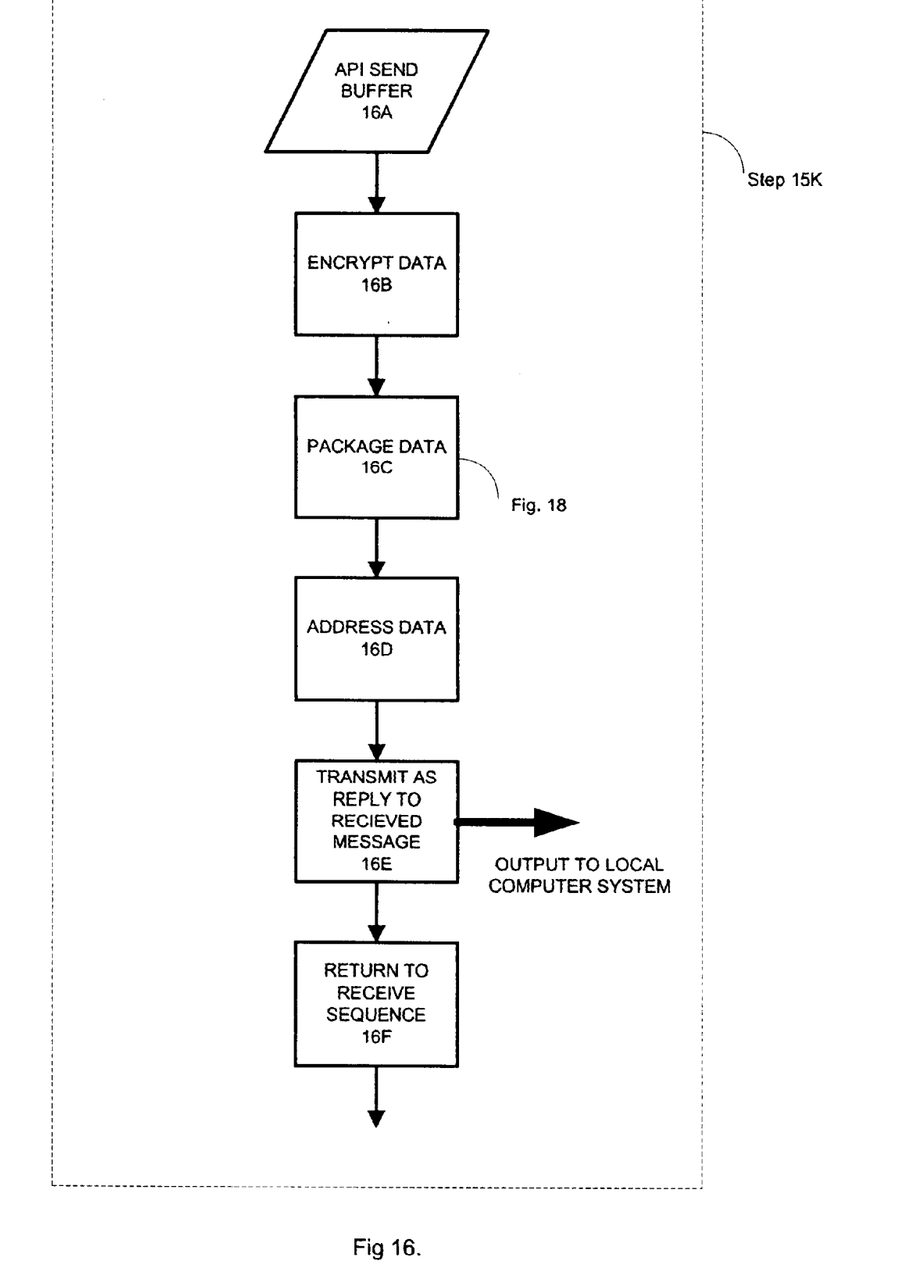
FIG. 16 is a flow chart generally illustrating an embodiment of the process message step of FIG. 15 by which the public computer processes pending data into a reply to a received message in accordance with the present invention.

Description of FIG. 16

To transmit pending data from the public computer 20 to a local computer 11 over a currently established communication channel, the encryption unit 38' encrypts the data (Step 16B) present in its API send buffer 31'. In Step 16C, the packaging unit 40' aggregates all encrypted segments of the message data in the API send buffer 31' into a single payload, (as described more specifically below with respect to FIG. 18), and in Step 16D adds address and other header data to develop an Aggregated Data Packet (5H) as described above with respect to FIG. 5,. The control logic 44' then deposits the Aggregated Data Packet in the send buffer 32' and transmits it as a reply to the message last received from the local computer 11 (Step 16E). The control logic 44' then clears the API send buffer 31', and at Step 16F, returns to the receive sequence at Step 15C (FIG. 15).

Figure 18:
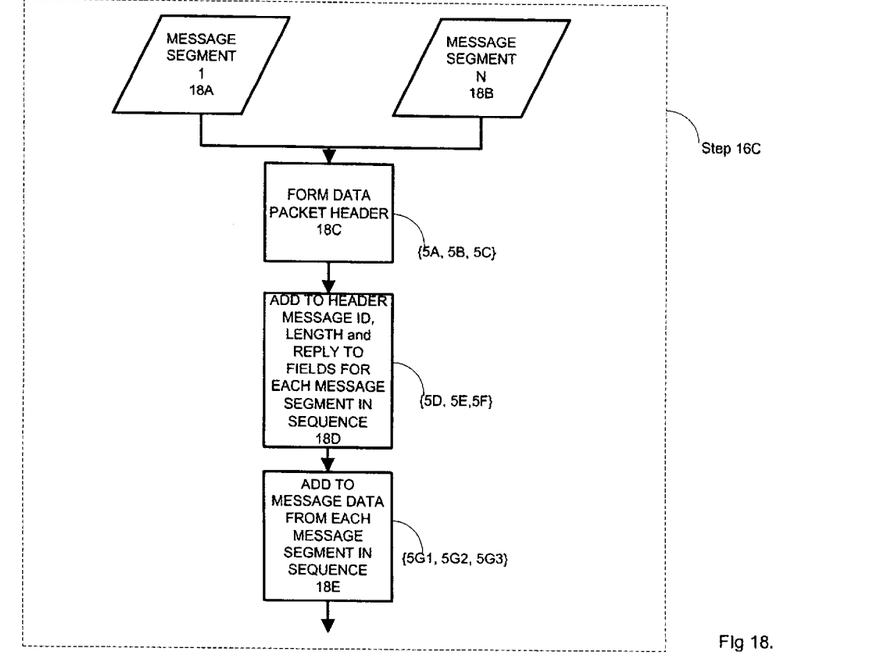
FIG. 18 is a flow chart generally illustrating an embodiment of the package data substep of FIG. 16 by which a public computer concatenates message segments into a composite payload message for transmission as a reply to a message received from a local computer in accordance with the present invention.

Description of FIG. 18

FIG. 18 depicts the packaging process Step 16C of combining multiple data segments (5G of FIG. 5) and associated header data (5A-5G) into one single message block (Aggregated Message Packet 5H) to be transmitted from the public computer 20 to the local computer 11 as a reply message. In Step 18C the packaging unit 40' forms the packet header by concatenating the Number of Message Segments 5A about to be sent, the Sender ID 5B and the Destination ID 5C. At Step 18D, the packaging unit 40' adds to the header in sequence, the Segment ID Number 5D, the Segment Length 5E, and the Reply to Local Message ID 5F for each Message Segment 5G about to be sent in this packet. At Step 18E, the encrypted data forming each Message Segment to be transmitted is concatenated and added to the packet being formed, to eventually obtain the Aggregated Data Message 5H.

Although the present invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A method of communicating unlimited data between a local computer system protected by a local firewall, and a remote computer system connected thereto via a public network, comprising the steps of:
   identifying the data limiting characteristics of the firewall;
   using a communications application to develop local message data to be communicated from the local computer system to the remote system;
   encrypting the local message data;
   dividing the encrypted local message data into payload chunks of predetermined size determined by the data limiting characteristics of the firewall;
   combining each of the payload chunks with identifying header data to form data packets;
   encapsulating the data packets into encapsulated data packets in accordance with a high-level data transport protocol;
   communicating the encapsulated data packets through the firewall to the remote computer system;
   stripping the encapsulation from the encapsulated data packets;
   separating the payload chunks from each data packet;
   recombining the payload chunks to reform the encrypted local message data;
   decrypting the reformed local message data;
   presenting the reformed local message data to an application in the remote computer system; and
   causing the remote computer system to return a reply message to the local computer system.

2. A method of communicating unlimited data between a local computer system protected by a local firewall, and a remote computer system as recited in claim 1 wherein the step of dividing the encrypted local message data into payload chunks of predetermined size includes
   calculating the number N of chunks in which to divide said local message data according to the relationship $N$=(local message data size)/(maximum message size−header size).

3. A method of communicating unlimited data between a local computer system protected by a local firewall, and a remote computer system as recited in claim 2 and further comprising:
   assigning a message ID to said local message data;
   assigning a chunk number to each said payload chunk; and
   combining the message ID, the chunk number, and the number of chunks N to develop said header data.

4. A method of communicating unlimited data between a local computer system protected by a local firewall, and a remote computer system as recited in claim 3 and further comprising:
   adding a Sender ID and a Destination ID to said header data.

5. A method of communicating unlimited data between a local computer system protected by a local firewall, and a remote computer system as recited in claim 4 wherein said data packets are encapsulated in an HTTP POST format.

6. A method of communicating unlimited data between a local computer system protected by a local firewall, and a remote computer system as recited in claim 4 wherein said data packets are encapsulated in an HTTP GET format.

7. A method of communicating unlimited data between a local computer system protected by a local firewall, and a remote computer system as recited in claim 1 wherein said reply message includes a plurality of message segments of substantially unlimited length, and further comprising:
   encrypting each said message segment;
   combining the encrypted message segments to form a message payload;
   combining the message payload with header data to form an aggregated data packet; and
   depositing the aggregated data packet in the send buffer of the remote computer system for transmission to the local computer system.

8. A method of communicating unlimited data between a local computer system protected by a local firewall, and a remote computer system as recited in claim 7 wherein said aggregated data packet is formed by
   concatenating said message segments to form the message payload;
   generating a header indicating
      the number of message segments,
      the sender ID, and
      the destination ID; and
   adding to said header a sequence of fields respectively corresponding to said message segments, each said field including
      the ID number of the corresponding message segment,
      the length of the corresponding message segment, and
      a sender message ID to which the message segment is a reply.

9. A method of communicating unlimited data between a local computer system protected by a local firewall, and a remote computer system as recited in claim 7 wherein upon receipt of said aggregated data packet by said local computer system, the encapsulation is stripped therefrom, the message payload is separated into separate message segments, and a reply data packet is generated for each message segment by
   forming a header including
      the sender ID, and
      the destination ID;
   prepending the message ID to the header;
   appending the reply to ID to the header; and
   appending the message segment to the header.

10. A data communication system, comprising:
    means forming a communications firewall having data limiting characteristics;
    a local computer system communicatively coupled to said firewall and including
       means for encrypting a block of local message data;
       means for dividing the encrypted local message data into payload chunks of predetermined size determined by the data limiting characteristics of the firewall;
       means for combining each of the payload chunks with identifying header data to form data packets;
       means for encapsulating the data packets into encapsulated data packets in accordance with a high-level data transport protocol; and
       means for communicating the encapsulated data packets through the firewall to a remote computer system.

11. A data communication system as recited in claim 10, wherein said means for dividing the encrypted local message data into payload chunks of predetermined size includes
    means for calculating the number N of chunks in which to divide said local message data according to the relationship $N$=(local message data size)/(maximum message size−header size).

12. A data communication system as recited in claim 11, wherein said means for combining each of the payload chunks with identifying header data to form data packets includes
- means for assigning a message ID to said local message data;
- means for assigning a chunk number to each said payload chunk; and
- means for combining the message ID, the chunk number, and the number of chunks N to develop said header data.

13. A data communication system as recited in claim 12, wherein said means for combining each of the payload chunks with identifying header data to form data packets further includes
- means for adding a Sender ID and a Destination ID to said header data.

14. A data communication system as recited in claim 12, wherein said high level data transport protocol is HTTP.

15. A data communication system as recited in claim 14, and further comprising a remote computer including
- means for receiving and stripping the encapsulation from the encapsulated d
- means for separating the payload chunks from each data packet;
- means for recombining the payload chunks to reform the encrypted local message data;
- means for decrypting the reformed local message data;
- means for presenting the reformed local message data to an application in the remote computer system; and
- means for causing the remote computer system to return a reply message to the local computer system.

16. A data communication system as recited in claim 15, wherein said reply message includes a plurality of message segments, and wherein said remote computer system further includes
- means for encrypting each said message segment;
- means for combining the encrypted message segments to form a message payload; and
- means for combining the message payload with header data to form an aggregated data packet, said aggregated data packet being deposited in the send buffer of the remote computer system for transmission to the local computer system.

17. A data communication system as recited in claim 15, wherein said remote computer system includes means for sending an email to the local computer system indicating that a message is waiting, and wherein said local computer system includes means responsive to said email for causing said local computer system to send a request to said remote computer system requesting a reply.

18. A data communication system as recited in claim 15, wherein said reply message includes a plurality of message segments packaged in an aggregated data packet formed by
- means for concatenating said message segments to form the message payload;
- means for generating a header indicating
  - the number of message segments,
  - the sender ID, and
  - the destination ID; and
- means for adding to said header a sequence of fields respectively corresponding to said message segments, each said field including
  - the ID number of the corresponding message segment,
  - the length of the corresponding message segment, and
  - a sender message ID to which the message segment is a reply.

19. A data communication system as recited in claim 18, wherein said local computer system includes
- means for stripping the encapsulation therefrom,
- means for separating the message payload into separate message segments,
- means for generating a reply data packet for each message segment by
  - forming a header including
    - the sender ID, and
    - the destination ID;
  - prepending the message ID to the header;
  - appending the reply to ID to the header; and
  - appending the message segment to the header.

* * * * *